Patented Oct. 21, 1947

2,429,479

UNITED STATES PATENT OFFICE 2,429,479

LUBRICATING OIL COMPOSITIONS CONTAINING WAX MODIFYING AGENTS

Louis A. Mikeska, Westfield, N. J., assignor to Standard Oil Development Company, a corporation of Delaware No Drawing. Application June 30, 1943,
Serial No. 492,901

4 Claims. (Cl. 252—52)

This application is a continuation-in-part of copending application Serial No. 268,019, filed April 15, 1939.

The present invention relates to the production of improved pour depressants or wax modifying agents, and to such materials, as well as waxy lubricating oils containing the same. The invention will be fully understood from the following description:

It has been found that wax modifying agents can be made from various oil soluble resinous materials containing ring structures. The most desirable raw materials are synthetic resins of the class described which have low to medium molecular weights and preferably which are freely soluble in lubricating oils. Among the various types of resins that can be employed may be mentioned the condensation products of cyclic hydrocarbons or simple derivatives with alkyl polyhalides, or cyclic hydrocarbons with acetylene or vinyl compounds, or cyclic hydrocarbons with dienes or polyenes, or the same with aldehydes, phenols with aldehydes, phenol sulphide resins, and the like.

The above resins, as stated, should be from medium to low molecular weights, and preferably oil soluble. It is difficult to place the exact limit of molecular weight which is satisfactory for the present process, since it varies with the different types of compounds within the general classes, but the molecular weight of the original resin can be fairly accurately controlled by methods known for the original resinification reactions, and the only significant point here is to note that if the original resin is too high, a product of such molecular weight will be obtained as to be of too limited oil solubility. In such cases a large part of the product may be useless for present purposes. Such part as is soluble in hydrocarbon oils may be segregated and used, but it is preferable to choose a medium to low molecular weight, so as not to exceed the maximum molecular weight for a reasonably high oil solubility after subsequent reactions, and in this way a larger yield of the wax modifying agent is obtained.

The present process consists in acylating the low molecular weight oil soluble resin with an acid halide, especially with an acid chloride of high molecular weight. Various acid halides can be used, but it is preferable to use the halides of fatty acids having a chain length of at least 6 carbon atoms. Stearic acid chloride is quite suitable for the purpose, but the halides of unsaturated acids such as oleic acid and similar reagents may be employed, as well as mixed acid halides such as are found in the acids occurring in natural fats or fatty oils, or which may be prepared synthetically, for example, by the direct oxidation of paraffin wax or highly purified petroleum oil, deoiled petrolatums and the like.

The acid halides may be obtained by different methods, but they are ordinarily prepared by reacting a free acid with phosphorous chloride according to the well-known procedure. The product should be carefully dried before being employed to acylate the resin.

The proportion of acid chloride to resin may vary within wide limits, but a ratio of 1 to 1 or even 2 to 1 of the acid chloride to each aromatic group within the resin molecule is satisfactory. For this recondensation or acylation a temperature from about room temperature to 300° F. can be used, preferably employing a solvent such as naphtha, carbon disulfide, carbon tetra chloride or tetra chlor ethane. As catalyst, aluminum chloride or other Friedel-Crafts catalysts such as boron fluoride, zinc chloride and titanium fluoride are used, ordinarily in the proportion of one mol of the catalyst for each mol of the acid chloride. The ingredients or reactants are first mixed and thoroughly stirred while the catalyst is slowly added thereto, and stirring is continued for an hour or more to complete the reaction. The product is apt to become quite thick or viscous at this point and an additional amount of solvent may be required to produce a mixture which can be readily handled.

The reaction mixture is now preferably hydrolyzed by addition of water or aqueous alcohol, and the desired fractions are extracted from the mixture with kerosene or naphtha. The kerosene and accompanying solvent is then distilled, leaving the desired product as a distillation residue.

The resins may, as stated before, be chosen from a wide variety of types. The synthetic types are preferred, since their molecular weights and other properties may be chosen so as to give the most desirable results. In all cases the recondensed or acylated products are of fairly high molecular weight, green to brown in color, stable, and endowed with marked wax modifying properties and are frequently capable of increasing viscosity index of oil to which they are added. The amount of such agents required for reducing the pour points of waxy oils depends to some extent on the particular agent, as well as the oil in which it is to be used, but ordinarily 1% is sufficient. In some instances the amount may vary from ¼ to 5.0%. The same agents may be employed as modifying agents in dewaxing processes, or, in fact, in any other processes where it is desired to modify the crystal structure of the wax. To increase viscosity index it is desirable to add more of the modified resin than used for reducing pour point for example from 3 to 10%.

The modified resins disclosed above may be added to all types of oils for example to lubricating oils for any type of crude, to synthetic oils or to solvent extraction products, hydrogenated oils and the like. The product described herein may be the only addition agent but other products may be added such as thickeners, soaps, oxidation inhibitors, sludge dispersers and the like.

*Example 1*

A resin was first prepared as follows: Petroleum aromatic hydrocarbons boiling from 137° to 140° C. were condensed with paraformaldehyde, 7 parts of the aromatics to 2 of the aldehyde by refluxing along with 20 parts of acetic acid and a small amount of zinc chloride. After refluxing for an hour the resin begins to form but is gummy and very soft. By refluxing from 7-12 hours a resin of 110° to 135° C. melting point is obtained. 20 grams of this resin is used in 100 cc. of carbon disulphide as a solvent. Stearyl chloride was then prepared from 42 grams of stearic acid and this was added to the solution of the resin. The mixture was agitated at room temperature and 20 grams of aluminum chloride was then added while continuing the agitation. The mixture was allowed to stand overnight and then neutralized with a mixture of ice and hydrochloric acid, and extracted with ether. After washing with water to remove the acid the solvent was removed by distillation, and the residue so obtained redissolved in ether and the free stearic acid removed by treatment with gaseous ammonia. The product was now filtered, and the solvent removed by distillation to 200° C. under 5 mm. mercury pressure. The bottoms so obtained comprised 38 grams of a dark brown viscous oil.

When 1% of this condensation product was added to a waxy oil the pour point was reduced from an original +30° F. to 0° F.

*Example 2*

A benzene resin was prepared in the following manner. 230 cc. of benzene was condensed with 200 cc. of ethylene dichloride, using 20 grams of aluminum chloride. The mixture was refluxed for an hour under a return condenser and at the end of this period a great thickening was noted. It was immediately diluted with 200 cc. of ethylene dichloride and the entire mixture was then poured into 500 cc. of aqueous alcohol. This mixture was now extracted with 500 cc. of kerosene and the kerosene extract washed with water and distilled with fire and steam to 600° F. to remove the solvent and low boiling products. The bottoms so obtained comprised 153 grams of a deep green very viscous resinous mass, which will be referred to hereafter as "benzene-resin."

*Example 3*

75 grams of the "benzene-resin" prepared as above was dissolved in 100 cc. of tetrachlorethane. To this was then added stearyl chloride which was prepared from 50 grams of stearic acid and 15 grams of phosphorous chloride. 25 grams of aluminum chloride was added slowly at room temperature with suitable agitation, and the agitation was continued for about an hour. The reaction mixture was then diluted with kerosene, neutralized with aqueous hydrochloric acid, and after settling, the kerosene layer was distilled with fire and steam to 600° F. in order to remove the solvent and low boiling products. The bottoms comprised 85 grams of a green viscous oil.

The pour depressant potency of the product was then tested by blending in a waxy oil, with the following results:

| | Pour point °F. |
|---|---|
| Original oil | +30 |
| Original oil + 1% "benzene-resin" | +30 |
| Original oil + 1% stearylated benzene-resin | −25 |

*Example 4*

75 grams of the "benzene-resin" referred to above was dissolved in 150 cc. of tetrachlorethane, and stearyl chloride prepared from 75 grams of stearic acid and 23 grams of phosphorous chloride was added. 38 grams of aluminum chloride was employed as a catalyst, and after the addition thereof the reaction mixture was heated to 100° C. and maintained thereat for about an hour, while being agitated. After cooling, this product was diluted with kerosene, neutralized as described above, and after distillation a residue of 96 grams of a deep green viscous oil was obtained. 1% of this product was blended in a waxy oil, and reduced the pour point thereof from +30 to −20° F.

*Example 5*

A "tetralin-resin" was prepared in the following manner. A mixture of 270 cc. of tetrahydronaphthalene, 260 cc. of ethylene dichloride and 30 grams of aluminum chloride were refluxed under a return condenser for 1½ hours. This mixture was then poured into 500 cc. of kerosene and 500 cc. of a water-alcohol mixture. The mixture was vigorously agitated so as to permit hydrolysis of the catalyst sludge and extraction of the oil-soluble ingredients in the kerosene. 250 cc. of ethylene dichloride was then added to assist the solution of the resinous material in the kerosene, and after settling, the kerosene layer was removed and distilled as before. 180 grams of a reddish-green very viscous oil was then obtained, which will be referred to hereafter as "tetralin-resin."

*Example 6*

A series of "stearylated-tetralin resins" was now prepared by the following general method: The tetralin resin was dissolved in tetrachlorethane as a solvent, and to this stearyl chloride prepared from stearic acid and phosphorus trichloride was then added. To this mixture aluminum chloride was added at room temperature while being agitated. After the addition of the aluminum chloride the reaction mixture was heated to 100° C. and maintained thereat for an hour. After cooling, the reaction mass was extracted with kerosene and neutralized as in Example 3 above. After settling, the kerosene extracts were distilled with fire and steam to 600° F. in order to remove solvent and low-boiling products, and the wax modifying agents obtained as a residue.

The following table summarizes the proportion of ingredients used and yields obtained, as well as the potency of the products on blending with waxy oil. For comparison, the pour depressant potency of the original tetralin-resin is also included.

| Run # | Original Waxy oil +1% "Tetralin-Resin" | | | Pour Point of Waxy Oil, Conc. of Stearylated Resin | |
|---|---|---|---|---|---|
| | Gms. of Tetralin Resin | Gms. of Stearic Acid | Yield | 1.0% | 5.0% |
| | | | Grams | | |
| 1 | 85 | 50 | 116 | +25 | −10 |
| 2 | 75 | 75 | 97 | +10 | −10 |
| 3 | 50 | 75 | 114 | −10 | 0 |
| 4 | 50 | 100 | 124 | −15 | −5 |
| 5 | 50 | 125 | 138 | −20 | 0 |

*Example 7*

5% of a "stearylated tetralin-resin" prepared as in the above example, run #3, was added to a Manchester spindle oil and the viscosity in Saybolt seconds determined both at 100° and 210° F. The following viscosity index was obtained from this data:

| | Vis./100 | Vis./210 | V. I. |
|---|---|---|---|
| Manchester Spindle Oil | 149 | 42.9 | 100 |
| Manchester Spindle Oil+5% stearylated tetralin-resin | 175 | 45.6 | 114 |

*Example 8*

A "naphthalene-resin" was prepared in the following manner. 256 grams of naphthalene, 240 cc. of ethylene dichloride and 30 grams of aluminum chloride were refluxed under a return condenser for 30 minutes. After cooling, the product was extracted with ethylene dichloride, neutralized with aqueous alcohol, and after separation of the ethylene dichloride layer the product was distilled to 600° F. so as to collect the bottoms, comprising 109 grams of a dark red solid resinous mass. This is referred to in the subsequent example as "naphthalene-resin."

*Example 9*

75 grams of "naphthalene-resin" was dissolved in 150 cc. of tetrachlorethane as solvent. To this was added the total amount of stearic chloride which was prepared from 50 grams of stearic acid and 15 grams of phosphorous chloride. 25 grams of aluminum chloride was then added slowly at room temperature and the mass was thoroughly agitated and heated to 100° C., at which temperature it was held for about an hour. After cooling, the reaction mixture was extracted with kerosene and neutralized with aqueous alcohol. After settling, the kerosene extract was distilled with fire and steam to 600° F. The bottoms obtained in this manner comprised 82 grams of a dark brown resinous solid.

The pour inhibitive potency of this condensation product was then tested by blending in a waxy oil as before. For comparison the "naphthalene-resin" of the previous example was blended in the same oil. The following results were obtained:

Pour point °F.
Original oil _____ +30
Original oil+1% "naphthalene-resin" _____ +20
Original oil+1% "stearylated naphthalene resin" _____ −10

*Example 10*

A round bottom flask equipped with a return condenser was charged with 200 cc. of petroleum aromatics (boiling point 138°–140° C.), 55 grams trioxymethylene, 500 cc. glacial acetic acid, and 30 grams concentrated $H_2SO_4$. This reaction mixture, which consisted at first of a homogeneous solution separating into two layers after about two hours heating, was then refluxed for 16 hours. On completion of the reaction, benzol was added and the resin layer was separated from the acetic acid by means of a separatory funnel. The benzol extract was washed free of sulfuric acid with water and finally dried over sodium sulfate. On removal of the benzol by distillation the resin was obtained as a green-colored brittle material. In order to obtain a resin of sufficiently high softening point, the crude resin was subject to distillation under 3 mm. pressure at a temperature of 250° C. The residue constituted the finished resin. In order to obtain the improved pour depressants or wax-modifying agents of the present invention, this finished resin was acylated in the manner described in Example 1.

*Example 11*

A round bottom flask was charged with 200 cc. petroleum aromatics (boiling point 138°–140° C.), 55 grams trioxymethylene, 500 cc. glacial acetic acid and 100 cc. of 85% phosphoric acid. The mixture was refluxed for 16 hours, the resulting resin separated, purified and acylated as in Example 10.

The present invention is not to be limited by any theory of reaction or by any specific type of resin or acylating agent that may have been employed. There is to be understood a resin containing a cyclic radical, either aromatic or hydroaromatic, and specific types of the resin are described as formaldehyde-cyclic resin, vinyl-cyclic resins, lower alkyl polyhalide-cyclic resins, diene or polyene-cyclic resins, and the like.

I claim:

1. A lubricating oil composition comprising a wax-containing mineral oil and an amount sufficient to substantially reduce the pour point but not in excess of 5% of a product obtained by reacting aromatic hydrocarbons with a material of the group consisting of formaldehyde and polymers thereof in the presence of sulfuric acid as a catalyst to produce a formaldehyde-cyclic resinous product, acylating the resultant product in the presence of a Friedel-Crafts catalyst with an acylating agent whose acyl groups contain at least 6 carbon atoms per molecule.

2. A lubricating oil composition comprising a wax-containing mineral oil and an amount sufficient to substantially reduce the pour point but not in excess of 5% of a product obtained by reacting aromatic hydrocarbons with paraformaldehyde in the presence of sulfuric acid as a catalyst to produce a formaldehyde-cyclic resinous product in the presence of a Friedel-Crafts catalyst, acylating the resultant product with an acylating agent whose acyl groups contain at least 6 carbon atoms per molecule.

3. A lubricating oil composition comprising a wax-containing mineral oil and an amount sufficient to substantially reduce the pour point but not in excess of 5% of a product obtained by reacting aromatic hydrocarbons with paraformaldehyde in the presence of sulfuric acid as a catalyst to produce a formaldehyde-cyclic resinous product, acylating the said product with stearyl chloride in the presence of a Friedel-Crafts acylating catalyst.

4. A lubricating oil composition comprising a wax-containing mineral oil and an amount sufficient to substantially reduce the pour point but not in excess of 5% of a product obtained by reacting aromatic hydrocarbons with paraformaldehyde in the presence of sulfuric acid as a catalyst to produce a formaldehyde-cyclic resinous product, and thereafter acylating the said product with stearyl chloride in the presence of aluminum chloride as an acylating catalyst.

LOUIS A. MIKESKA.

REFERENCES CITED

The following references are of record in the file of this patent:

UNITED STATES PATENTS

| Number | Name | Date |
| --- | --- | --- |
| 2,393,181 | Mikeska | Jan. 15, 1946 |
| 2,270,062 | Lieber | Jan. 13, 1942 |
| 2,147,547 | Reiff | Feb. 14, 1939 |
| 2,147,545 | Reiff | Feb. 14, 1939 |
| 2,048,465 | Reiff | July 21, 1936 |
| 2,062,677 | Reiff | Dec. 1, 1936 |
| 2,061,008 | Reiff | Nov. 17, 1936 |
| 2,251,550 | Lieber | Aug. 5, 1941 |
| 2,275,447 | Lieber | Mar. 10, 1942 |

OTHER REFERENCES

The Friedel-Crafts Syntheses, by N. O. Calloway. Chemical Reviews, volume 17, 1935, pages 377–379.